United States Patent [19]
Crooke et al.

[11] 3,722,268
[45] Mar. 27, 1973

[54] LOAD INDICATOR FOR MOORING LINE

[75] Inventors: Robert Curtis Crooke, Corona Del Mar; Carl E. Hilsabeck, Fountain Valley, both of Calif.

[73] Assignee: Global Marine Inc., Los Angeles, Calif.

[22] Filed: Mar. 4, 1971

[21] Appl. No.: 121,176

Related U.S. Application Data

[63] Continuation-in-part of Ser. No. 734,710, June 5, 1968, abandoned.

[52] U.S. Cl..................................73/143, 33/126.5
[51] Int. Cl..................................................G01l 5/04
[58] Field of Search ........73/143, 144; 33/70, 72, 69, 33/126, 1 LE, 1 AP; 235/197, 194

[56] References Cited

UNITED STATES PATENTS

| | | |
|---|---|---|
| 1,089,969 | 3/1914 | Schmid....................................33/69 |
| 2,669,785 | 2/1954 | Rydzewski..........................33/126.5 |
| 3,073,156 | 1/1963 | Rowe........................................73/143 |
| 3,354,297 | 11/1967 | Anderson et al. ....................235/181 |
| 3,428,788 | 2/1969 | Fisher et al........................235/150.2 |
| 479,404 | 7/1892 | Cutler..................................114/114 |
| 125,744 | 4/1872 | Low.....................................114/114 |

FOREIGN PATENTS OR APPLICATIONS 9,969  8/1885  Great Britain.......................33/126.5

OTHER PUBLICATIONS

"Analyzing Mooring Line Catenaries," Collipp, May, 1968; Petroleum Engineer Graphical Methods, Marshall, 1921.

Primary Examiner—James J. Gill
Assistant Examiner—Marvin Smollar
Attorney—Christie, Parker & Hale

[57] ABSTRACT

Mooring line load indicating apparatus having a sensing device connected to a mooring line and an associated indicator showing the slope of the line at a chock or the like and from which load in the line may be determined. Alternatively, the indicator may show the mooring line load directly. The invention also provides a method of mooring line load determination, which method includes the steps of determining the water depth, the slope of the mooring line at a chock or the like and applying such values to a graph to obtain a value of load in the line without the need of mental or mathematical operations.

12 Claims, 8 Drawing Figures

INVENTORS.
ROBERT CURTIS CROOKE
CARL E. HILSABECK
BY Christie, Parker & Hale
ATTORNEYS INVENTORS.
ROBERT CURTIS CROOKE
CARL E. HILSABECK
BY
Christie, Parker & Hale
ATTORNEYS

LOAD INDICATOR FOR MOORING LINE

CROSS REFERENCE TO RELATED APPLICATION

This application is a continuation in-part of copending application Ser. No. 734,710 filed June 5, 1968, now abandoned.

BACKGROUND OF THE INVENTION

1. Field of the Invention

This invention relates to mooring systems for vessels, and more particularly to apparatus and method for determining the load on a mooring line of a floating vessel.

2. Review of the Prior Art

The operator of a moored floating vessel is often concerned with whether the mooring lines of the vessel are overstressed. Breakage of a mooring line results in the loss of expensive anchors and mooring cable or chain. Obviously, the parting of a mooring line can also place the vessel itself in serious danger.

Attempts have been made in the past to give a ship operator an indication of the load on the vessel mooring lines. These attempts involved the use of strain gauges applied to the mooring line, say to a link of a mooring chain. The strain gages monitored the elongation of the link under stress, the amount of stress sensed being useful to estimate mooring line load by reference to load/stress data for the chain being monitored.

A major shortcoming of strain gauges results from the fact that they must be applied to the particular chain link or portion of a wire cable that is adjacent the vessel outboard of a hawsepipe, chock or fairlead. Such gauges must be applied to the mooring line each time the line is paid out since it cannot be known in advance which chain link or portion of the cable will be located next-outboard of the vessel for that particular mooring. The fragility of strain gauges does not permit them to withstand readily the rough treatment to which they are subjected on a vessel. Also, it is time consuming and requires significant expertise to properly apply a strain gauge to a chain link or to a wire rope mooring line. For these reasons, strain gauges have not been widely or very successfully used to monitor and measure mooring line loads.

A mooring line, be it a cable or a chain, extended from a floating vessel to a submerged anchor point is actually a catenary, and the mathematics pertinent to analysis of a catenary are applicable to mooring line analysis. A catenary is the shape assumed by a flexible line hanging between two support points. Until now, however, those concerned with ascertaining the load in a marine mooring line to a submerged anchor have considered that the mathematics of catenary analysis are not practically useful to the problem. This has been so because the submerged character of all but a small portion of the line has been regarded as making it impossible to assemble enough information to allow a mathematical solution to the problem to be pursued. That is, an indirect mathematical approach to the problem of the ascertaining load in a catenary conventionally requires knowledge of the geometry of the catenary and of the physical properties of the line defining the catenary. In the case of a mooring line extended from a floating vessel to a submerged anchor, however, the geometry of the catenary is hidden and this fact has been regarded as prohibiting the use of a mathematically oriented solution to the problem.

SUMMARY OF THE INVENTION

This invention involves the recognition of the fact that the known and readily ascertainable aspects of a mooring line catenary to a submerged anchor are sufficient to enable the load in the mooring line to be determined with a high degree of accuracy. Although a mooring line, especially a mooring chain, generally is not a perfectly flexible line, it can be treated as such for the purpose of quite closely approximating loads developed in it.

Generally speaking, the present invention provides a method for ascertaining the tension in a mooring line extending from a point of support on a vessel disposed in a body of water to an anchor disposed below the water surface at a measurable distance below the point of support, such as a chock on the vessel. The method comprises the step of providing a plurality of graphical representations of the functional relationship between the tension present in a mooring line having the same submerged weight per unit length as the mooring line of interest, and the angle which the mooring line makes with a reference direction at the point of support. Each of the representations corresponds to the functional relationship between tension and the angle for a specific value of vertical distance between the point of support and the anchor. The vertical distance between the chock and the anchor is measured, and the value of the angle at the chock is determined. These measurements are then applied to the graphical representations to locate the unique one of the representations which corresponds to the measured vertical distance. Then, on the unique representation a unique point is located which corresponds to the measured value of the angle, thereby also defining the value of tension present in the mooring line. For a given depth of water and mooring line characteristic, the slope of the line at the vessel is a function of the length of line paid out or of the horizontal distance between the vessel and the anchor, so that horizontal distance between the point of support and the anchor can be used if desired.

In terms of apparatus, this invention provides indicator means for indicating the slope of the mooring line relative to a horizontal reference plane at the point most outboard of the vessel at which the line is supported by the vessel. Means are provided for operatively yet releasably connecting the indicator means to the mooring line. The mooring line indicator is constructed so that line can be taken in or paid out from the vessel without totally disconnecting the indicator means from the mooring line.

The invention permits the vessel operator to determine the load on his mooring line as well as on the anchor itself. Thus, he can be alerted if the anchor is in danger of being lifted off the ocean floor; in the past it was not possible for him to obtain such an objective indication, since strain gauges are incapable of measuring this phenomenon directly or indirectly. Formerly, the operator had to rely almost exclusively on his experience and intuition to determine when the anchor might be lifted off the ocean floor.

BRIEF DESCRIPTION OF THE DRAWINGS

The above-mentioned and other features of this invention are more fully set forth in the following detailed description of presently preferred embodiments of structural and procedural aspects of the invention, which description is presented with reference to the accompanying drawings, wherein.

DESCRIPTION OF THE PREFERRED EMBODIMENTS

Figure 1:
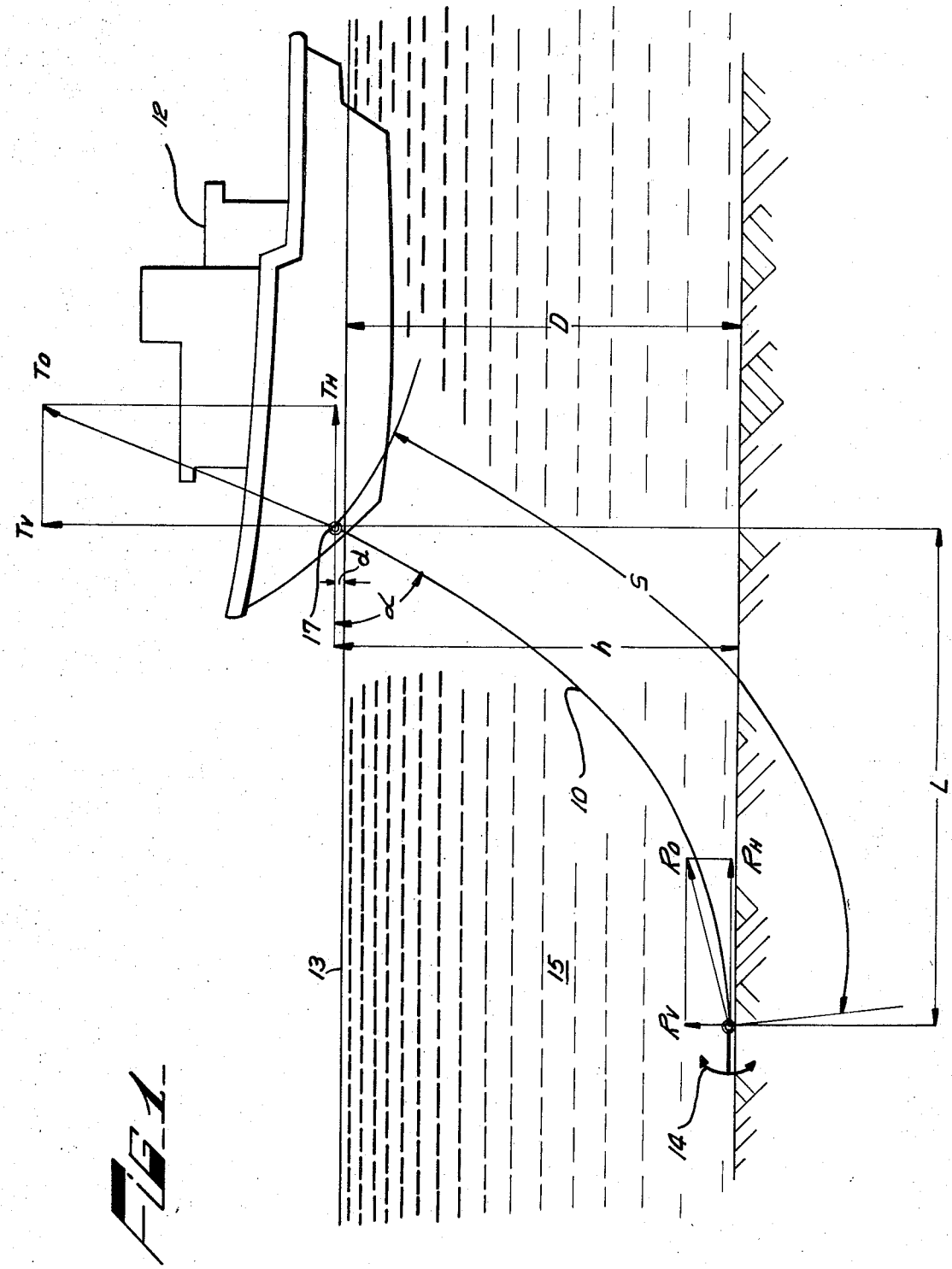
FIG. 1 is a view of a moored vessel, the parameters pertinent to catenary analysis, from which this invention proceeds, being shown relative to the vessel mooring system.

The forces at work on a mooring line catenary extending from a floating vessel 12 to a submerged anchor 14 are shown in FIG. 1. In FIG. 1, the mooring line 10 is shown tangent to the ocean floor at the anchor, but as will be shown below the principles involved in this invention also apply in cases where the mooring is tangent to the ocean floor along the line toward the vessel from the anchor. If X,Y coordinate axes are established through the point at which the mooring line is tangent to the ocean floor (at the anchor in FIG. 1), then the curve followed by the mooring line is described by the equation $$y = (R_H/w)[\cosh(wx/R_H) - 1] \quad (1)$$

as shown by *Mathematics of Physics and Modern Engineering*, Sokolnikoff and Redheffer, McGraw-Hill, 1958 at pages 40–42; as shown below, $w$ is the submerged weight per unit length of mooring line 10 and $R_H$ is the horizontal tension force in the line at the anchor, i.e., at the point where the line becomes tangent to the ocean floor. In equation (1), $y$ measures the distance from the sea floor and $x$ the horizontal distance from the point of tangency of the mooring line to the sea floor. From an inspection of FIG. 1, it is apparent that the tension in mooring line 10 is greatest ($T_o$) during static situations at hawsepipe 17 of vessel 12 where $y = h$ and $x = L$.

As noted above, for any practical tension measuring system pertinent to a marine mooring system of the type illustrated by FIG. 1, the tension in the mooring line must be determinable from data readily obtainable on the vessel. For any given mooring installation, the properties of the mooring line, including its submerged weight per foot of length, are readily determinable, either from the manufacturer or by calculation from dry weight and volume per foot of length; thus, $w$ is readily known. Also, water depth below the vessel and paid out length of mooring line are readily ascertainable, for any given mooring situation, from a fathometer and a counter or meter coupled to the anchor windlass, for example; thus, D and total length of line paid out are known. The height $d$ of the hawsepipe above the waterline is a physical property of the vessel itself, so that $h$ is known from this fact and from the value D, water depth over the anchor.

Because forces must be balanced at all points along the mooring line during steady-state condition, it can be seen that $T_H = R_H$ in value. Also, from FIG. 1, $T_H = T_o \cos \alpha$. $T_v$, at the hawsepipe, however, is due to the weight of the mooring line, so that $T_v = wS$. It must be remembered that $S$ is the length of the mooring line along the catenary from the hawsepipe to point at which the line is tangent to the sea floor, and that this length is invariably less than the total amount of mooring line paid out from the vessel; thus, $S$ is not a known quantity. On the other hand, the value of $\alpha$ can be measured.

Previously, it had been believed that the master of a vessel, such as vessel 12, did not have available or could not determine sufficient information, at the vessel, to enable the maximum load in the mooring line from time to time to be ascertained. It was for this reason that strain-gage instrumentation of the mooring line was practical, with its attendant problems and costs. This invention, however, involves the recognition that, proceeding from equation (1) and the other relations given above, the value of tension To in the mooring line at the hawsepipe (the maximum tension value for static and moderate dynamic situations) can be expressed in terms of those quantities which are either known or can be measured at the vessel. This expression is $$T = (w\,h/2)\,[\,(\cos\alpha + 1/\sin\alpha)^2 + 1\,] \quad (2)$$

This invention, therefore, proceding from this recognition, provides procedure and apparatus which enable the personnel involved on a particular floating vessel, equipped with mooring line of known physical properties and dimensions, to determine rapidly, accurately and without computation or mental evaluation and decision the mooring line tension by reference either to graphs prepared especially for use with the line on board or to an indicator mechanism coupled to the line.

The following description is presented with reference to chain mooring line. Users of wire rope mooring lines will be able to practice this invention in view of the following discussion, and thus the broad aspects of this invention comprehend both chain and wire rope mooring systems.

FIG. 1, already referred to, shows the parameters and variables at play in a catenary mooring system connected between a floating vessel 12 and an anchor 14. As shown in FIG. 1, a mooring line 10 is connected to vessel 12 floating on the surface 13 of a body of water 15, via a hawsepipe 17 through which the line is lead to a suitable winch. The total length of line paid out by the vessel from the hawsepipe (or fairlead or closed chock, if applicable, depending on the type of mooring rigging selected) is indicated by parameter $S$. The vertical distance from the hawsepipe, the most outboard point of support of the mooring line by the vessel, to anchor 14 is indicated by parameter $h$, $h$ being the sum of water depth D and the height $d$ of the hawsepipe above the vessel's draft waterline. Parameter L is the distance horizontally from the hawsepipe to the anchor. The load in the line at the anchor, or at the point along the line at which the line begins to lie along the ocean bottom in instances where the anchor is not the lower terminus of the catenary portion of the length of the line, is force $R_o$ which has vertical and horizontal components $R_V$ and $R_H$. The tension load in the mooring line at the vessel, this being the load value most commonly of interest, is $T_o$ and has vertical and horizontal components $T_V$ and $T_H$. $\alpha$, is a measure of the effective length of mooring line capable of catenary action for a given type of mooring line used in connection with a given value of $h$. These facts, then, in view of equation (2) set forth above, enable the use of graphs to determine $T_o$ once $\alpha$ has been determined. Alternatively, $\alpha$ need not be known to enable a graphical solution for $T_o$ if L is known. Frequently L is known where the anchor is a pile or the like projecting above the water surface or can be determined by the use of shipboard acoustical depth sounders; where depth sounders are used to determine L, the use of an acoustic reflector on the anchor may be in order.

Figure 3:
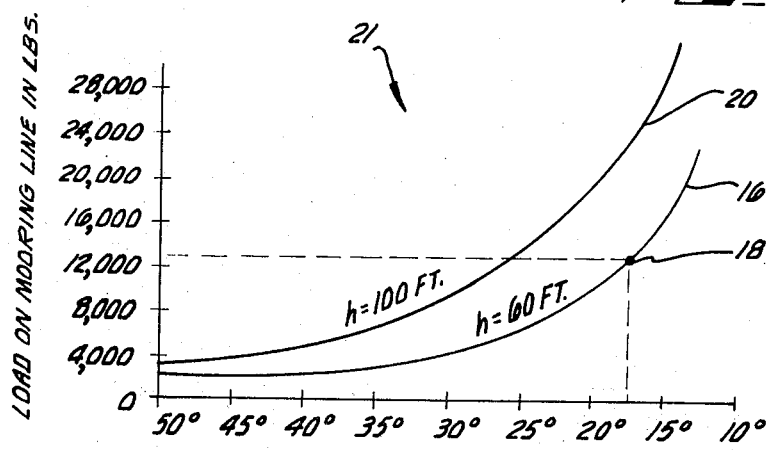
FIG. 3 is a graphic representation of mooring line tension as a function of the water depth and the angle between the mooring line and the horizontal.

FIG. 3 is a graph 21 useful in determining mooring chain tension at a hawsepipe or closed chock when $\alpha$ and h are known for a given size of chain; the graph of FIG. 3 pertains to a 15/16 inch steel anchor chain. As shown in FIG. 3, values of $T_o$ are plotted vertically on Cartesian coordinates and values of $\alpha$ are plotted horizontally. Contours 16 and 20 for varying values of $h$ are also presented on the graph. Thus, knowing h and $\alpha$, it is essentially a mechanical, rather than a mathematical or reasoning process to determine $T_o$. For example, if the vertical distance $h = D + d$ from the ocean floor to the most outboard point of support of the chain by the vessel $(D + d)$ is 60 feet (curve 16) and the angle of declination ($\alpha$) of the chain from a horizontal reference plane at the point of support is 17.5°, the tension in the 15/16 inch chain at the point of support is approximately 13,000 pounds as given by point 18 on curve 16. ($T_o$ normally is the maximum tension present in the chain between the vessel and the anchor.) Similarly, if the value of $h$ is 100 feet, curve 20 is used to determine the maximum value of chain tensile load. The only additional requirement associated with graph 21 is that S, the amount of chain paid out, must be at least $5h$; most mooring situations meet this criterion.

In practice, graph 21 includes a plurality of contours similar to curves 16 and 20, each contour corresponding to a different value of $h$. Graph 21 is in fact the result of a series of solutions of equation (2) for two different constant values of $h$ (60 feet and 100 feet) and different values of $\alpha$. Conversely, given curves 16 and 20 of graph 21, equation (2) can be derived by use of curve fitting techniques; see *Higher Mathematics for Engineers and Physicists*, I. S. and E. S. Sokolnikoff, McGraw-Hill, 1934, page 396 et seq.

It will be understood that a different graph, each similar to graph 21, is required for each different size of chain or cable which may be used on a particular vessel. Each different graph reflects a particular value of $w$.

Figure 6:
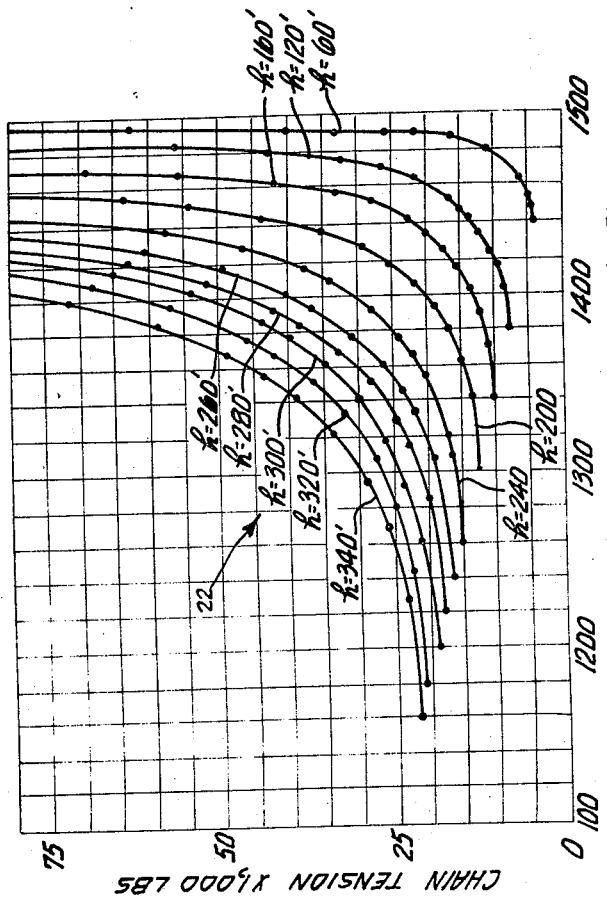
FIG. 6 is a graphic representation of the relation of mooring line tension to water depth and to the vessel's horizontal displacement from its anchor.

FIG. 6 shows a graph 22 which may be used to determine the value of $T_o$ for a particular mooring line in instances where L, the horizontal distance from the anchor to the nearest point of support of the mooring line by the vessel, is known; graph 22 does not involve knowledge of the value of $\alpha$. Graph 22 is readily prepared using the foregoing relationship, and by assuming constant values of $w$ and $h$ to determine $T_o$ as a function of L for various assigned values of $\alpha$. A graph 22 is prepared for each size of chain or mooring cable which may be used. As in graph 21, the vertical ordinate in graph 22 is the mooring line tension $T_o$ ordinate. Horizontal distance L is plotted horizontally in graph 22. A family of contours 23, each corresponding to a particular value of $h$, also is plotted in the graph.

Figure 2:
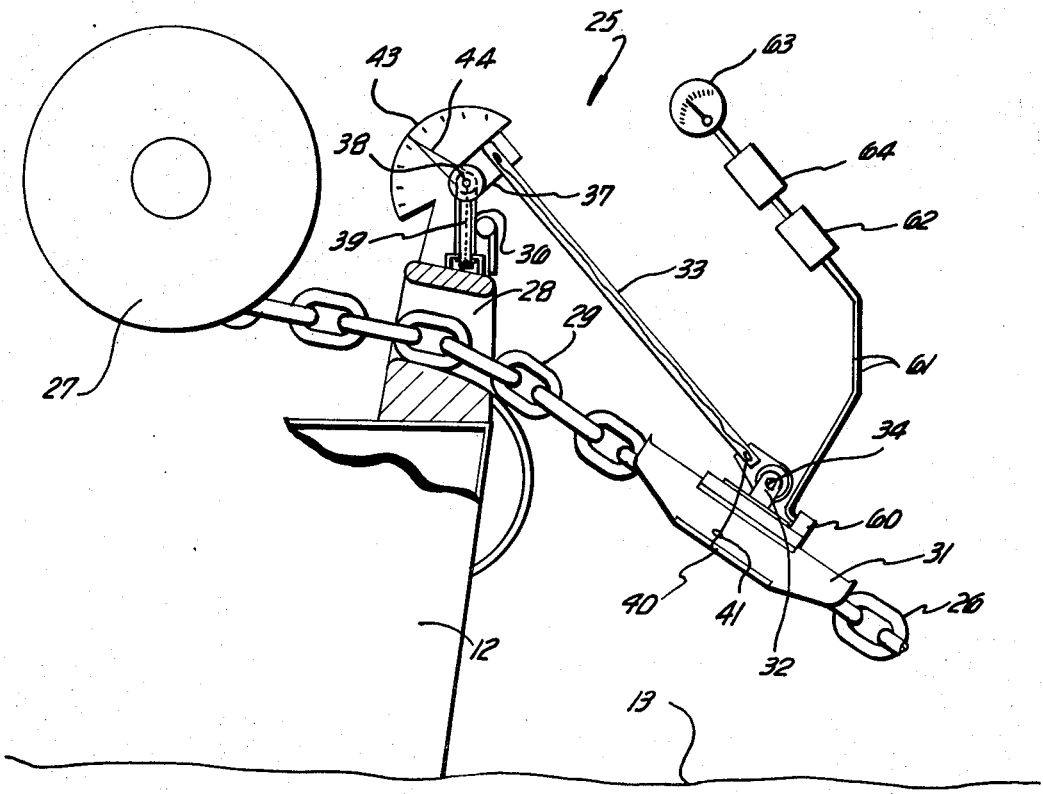
FIG. 2 is a fragmentary side elevational view, partially in section, of a vessel fitted with apparatus for indicating the slope of the mooring line.

Referring now to FIG. 2, a sensing indicator 25 for determining the angle of declination from the horizontal of anchor chain 26 is shown. Chain 26 extends from a winch 27 through a closed chock 28 from vessel 12 to the anchor; it will be understood, however, that indicator 25 may be used in conjunction with a hawsepipe or cable fairlead instead of with a closed chock, if desired. The last link of the chain engaged with the vessel is designated link 29. Engaged with the chain adjacent chock 24, outboard of the vessel, and above water surface 13 is a generally U-shaped elongated shoe 31 which is inverted and extends over a plurality of chain links. The engagement of the shoe with the chain is such that the length of the shoe assumes an inclination equal to the slope of the chain adjacent the vessel. The side legs of the shoe extend sufficiently downwardly of opposite sides of the chain to assure that the shoe does not separate from the chain in use of indicator 25. A support bracket 32 is mounted on shoe 31 and pivotally mounts an elongated radius arm 33 to the bracket by means of a bolt 34. A second support bracket 36 is secured to chock 28 and pivotally mounts a connector plate 37 which is pinned to the end of the radium arm opposite from shoe 31. Preferably, the connector plate is pivotal both about a horizontal axis defined by pivot pin 38 which mounts the plate to bracket 36 and about a vertical axis relative to the chock, defined by a hinge pin 39 which connects bracket 36 to the chock, such that shoe 31 and the radius arm can move with chain 26 relative to the vessel as the vessel moves in response to wind and wave action.

Suitable means, such as a nylon rope 40, is secured to the radius arm and the elongated shoe and is wrapped around the shoe and the chain in a direction transverse to the axis of the chain so that the shoe and the arm are secured to the chain. Preferably, the nylon rope is laced through eye-bolts 41 secured to the radius arm and to the shoe to facilitate the removal and attachment of the rope from the elongated shoe and the anchor chain. The anchor chain can be hauled aboard the vessel or additional chain can be paid out without having to remove the shoe since the chain slides freely in the space defined by the shoe and the rope. Also, the shoe is readily removable from the chain in the event that the anchor is weighed.

A scale 43, graduated in degrees of arc, is secured to bracket 36 and cooperates with a pointer 44 which is secured to plate 37 and extends radially from pivot pin 38. The pointer and the scale cooperate to define an indicator the scale of which is oriented relative to the structure of the vessel so that the reading provided by the indicator is the angle between the chain outboard of the chock and a horizontal reference plane. Thus, indicator 25 provides a direct measurement of the value of angle $\alpha$, see FIG. 1. Once the slope of chain 26 outboard of the chock is known, the depth of the water below the vessel and the height of the chock above waterline 13 having been determined, the person desiring to know the tension in the chain consults a graphic diagram of the type shown in FIG. 3 to obtain directly therefrom the tension which exists in the chain.

To enable the reading of scale 43 even if the vessel pitches, as in a severe storm, the scale can be rotatably mounted on pin 38 and counterbalanced so that it always seeks what corresponds to a horizontal position. This modification avoids the necessity of having to approximate the chain angle by averaging the different values of $\alpha$ obtained at different times during motion of the vessel.

Figure 7:
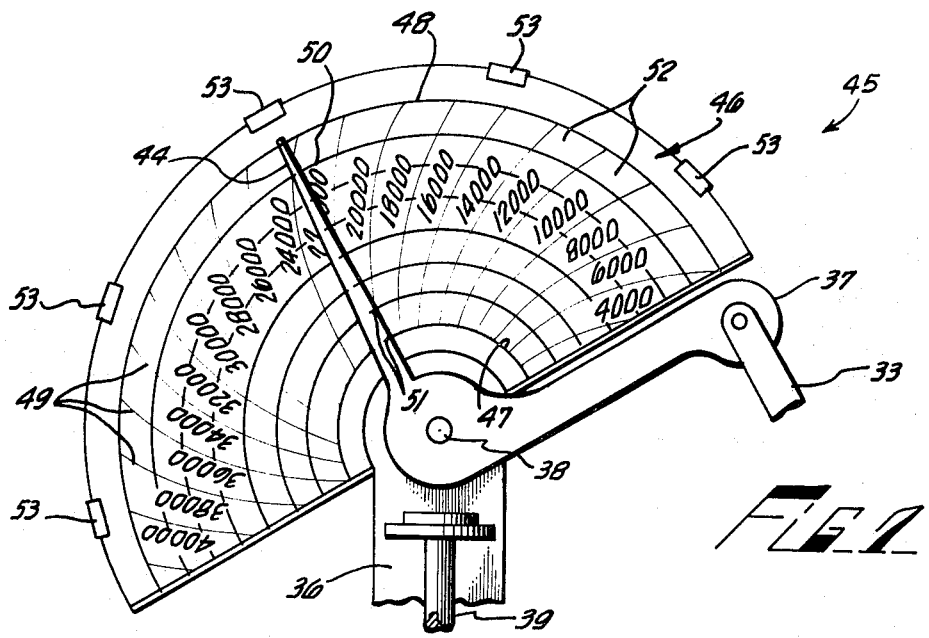
FIG. 7 is a fragmentary elevation view of another structural arrangement of the invention.

The use of graph 21 may be avoided by the use in indicator 25 of a scale of the type shown in FIG. 7, especially where the depth $D$ of water in which the vessel is floating is known. FIG. 7 shows an indicator 45 which is similar to indicator 25 except that instead of carrying a scale calibrated in degrees of arc, support bracket 36 carries a removable scale card 46, preferably made of plastic or celluloid to be resistant to the effects of weather, which incorporates the data of graph 21 for a selected range of values of $D$; lines 47 and 48 do not correspond to values of h since, for a given vessel, $d$ is known, although lines 47 and 48 could be representative of selected values of $h$, if desired. For example, as shown, card 46 includes inner and outer arcuate reference lines 47 and 48 concentric to pivot pin 38, which lines correspond to water depths of 60 and 100 feet, respectively. Curved lines 49 extend generally radially of the card between depth reference lines 47 and 48, such lines being constant tension value lines. One edge 50 of pointer 44 extends radially of pin 38 and is the edge of the pointer along which the card is read. An interpolating scale 51 is defined along pointer edge 50 so that water depths between 60 and 100 feet may be located readily. Similarly, a plurality of depth interpolating lines 52 are provided on the face of the card between lines 47 and 48. A set of scale cards 46, each covering a selected range of water depths, is provided for each size of chain which may be used. A given scale card is held in place on support bracket 36 by spring clips 53 engaged with the card at spaced locations around the common periphery of the card and the support bracket.

One desiring to determine the tension in chain 22 may use indicator 45 to obtain a figure of chain load directly. Knowing the depth of water in which the vessel floats, say 80 feet, such person merely reads along scale 51 to locate the appropriate depth and interpolates between adjacent constant tension value lines 49 along pointer edge 50 to determine the chain tension, about 18,500 pounds, for that position of the pointer. The pointer is coupled to the chain outboard of the vessel as described above regarding apparatus 25.

Although the embodiments of the invention shown in FIGS. 1 and 7 work entirely satisfactorily and are an improvement over what has been available heretofore, it is frequently convenient to transmit measurements of the slope of the mooring line (FIG. 1) or of chain tension (FIG. 7) to a point removed from the mooring line itself. For example, the master of the vessel might wish to obtain information relating to the load on the anchor chain at the bridge of a ship. To transmit the reading of indicator 25 or 45 to a location remote from chock 28, an inclinometer 60 is secured to shoe 31. The inclinometer may be of conventional design readily available on the market. A suitable inclinometer is a potentiometer-type instrument manufactured by the Edcliff Instrument Company of Monrovia, California, Edcliff catalog item number 5-510. The inclinometer measures the angle of inclination of the elongated shoe, and the mooring line, relative to a horizontal reference plane and generates electric signals indicative of the measured angle. Leads 61 transmit the generated signals to a remote place, say the bridge of the ship, where they are applied to an amplifier 62 and fed to a readout device 63, such as a strip chart recorder, calibrated to indicate either the slope of the mooring line or, by using a scale calibrated directly in terms of mooring line tension, the tension in the mooring line. The electric signals from the inclinometer may be modified in a computer 64 to correct the signals for any inaccuracies in the output of the inclinometer caused by pitching, rolling or heaving of the vessel. Information concerning water depth may be applied to the inclinometer output signal in the computer, if desired.

Figure 8:
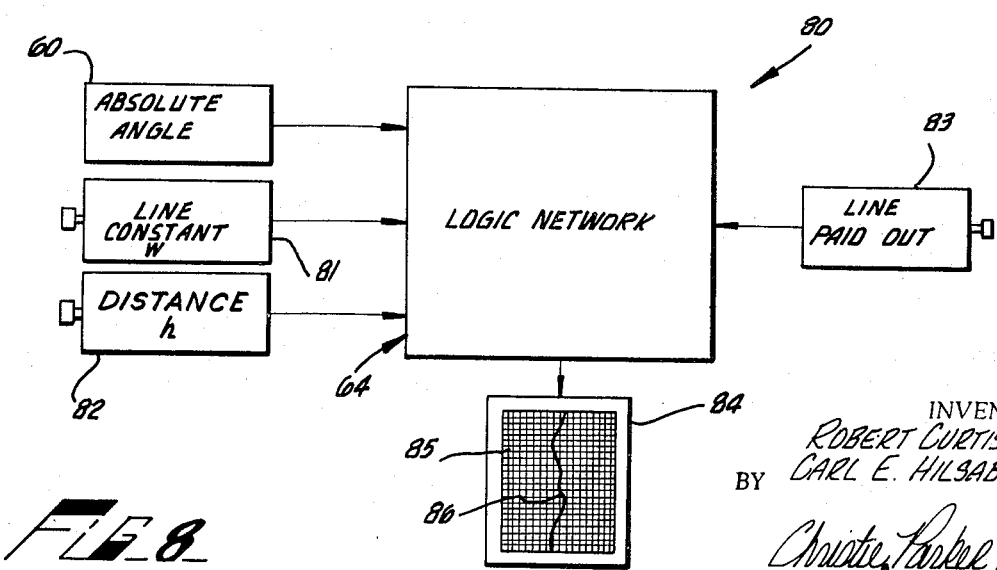
FIG. 8 is a block diagram of an instrumented automatic measurement system according to this invention.

FIG. 8 depicts an automated system 80 for obtaining measurements of mooring line tension directly. In such system, the measurement of absolute line declination angle is applied from inclinometer 60 directly to computer 64 which contains an analog logic network, e.g., for modulating the output of the angle sensing inclinometer to generate a line tension signal in a manner determined by the logic network and by the output of associated support signal generators. The support signal generators include an adjustable line constant signal generator 81, such as a potentiometer, the output of which has a value indicative of the value of $w$ for the mooring line then being monitored for tensions. Another adjustable signal generator 82, such as another potentiometer, has an output which is indicative of the value of $h$ for the particular mooring system. The output of the computer is applied to a strip chart recorder 84 which uses record material 85 graduated in units of mooring line tension. The trace 86 produced by the recorder may be read to obtain a value of line tension.

Where an automated system 80 is used to carry out this invention, it may be desirable to replace the conventional inclinometer referred to above by an inclinometer which includes an internal movement of the types shown in FIG. 3.1.20(a) or (b) at page 3–24, *Computer Handbook*, H.D. Huskey and G. A. Korn, Mc-Graw-Hill, 1962; such inclinometers produce output signals in terms of sin $\alpha$ and cos $\alpha$ and are useful directly in terms of equation (2). In view of the content of Sections 1 through 9 of *Computer Handbook*, such as pages 2–16, the specific analog logic network configuration useful to solve equation (2) is readily within the talent of a person familiar with analog computers, and therefore such configuration is not shown herein.

Figure 4:
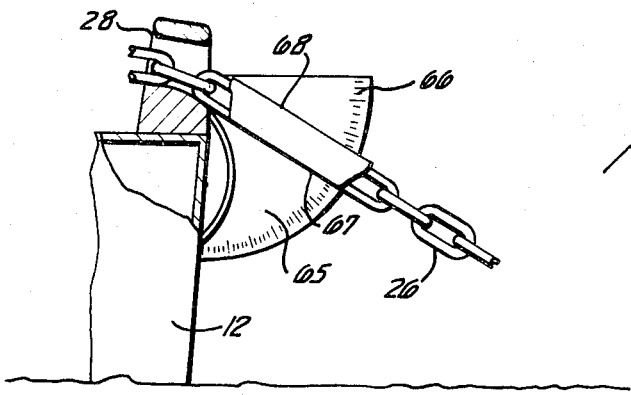
FIG. 4 is similar to FIG. 1 and shows another embodiment of apparatus of this invention.

In a simplified embodiment of this invention, a dial plate 65, shown in FIG. 4, is secured to the hull of vessel 12 in a vertical position adjacent chock 28. The dial plates carry a scale 66 calibrated in degrees of arc. By means of the scale, the inclination of the mooring line relative to a horizontal reference plane is determinable. To assist in reading the scale, a reference shoe 67, having a straight upper surface 68 is fitted to the chain adjacent plate 65 so as to be operatively coupled to the dial plate. If desired, scale 66 may be calibrated in terms of chain tension; in such instance the scale may be used only with a specified size of chain on a vessel moored in a known depth of water. Due to the large size of oceangoing vessels, and the difficulty with which a person may read a scale secured to the hull of such a vessel in the manner described immediately above, this embodiment of the invention is best suited for use on smaller vessels such as riverboats, barges, or the like.

Figure 5:
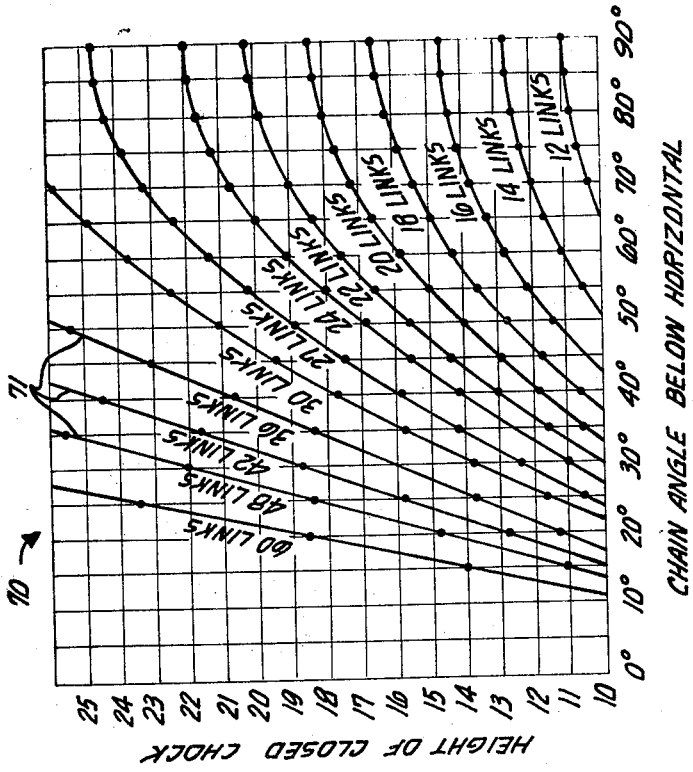
FIG. 5 is a graphic representation of the relation of chain angle below the horizon to chock height above the waterline and to the number of chain links between the chock and the waterline.

This invention is further practiced without the need for any apparatus by simply counting the chain links between the chock of the vessel and the waterline. Since the height of the chock above the waterline is known or can be measured, and since the length of each link is known, the slope of the anchor chain can be determined without the need of scales to measure it. In this instance, it is most convenient to provide graphs 70 (see FIG. 5) in which the coordinate axes represent the chock height and the chain angle, respectively, and in which there are plotted curves 71 representing the number of chain links counted. A person can determine the chain angle from the number of links and the chock height. This angle is then used, by reference to an appropriate graph 21, for example, to determine the tension in the anchor chain.

It will be apparent from the foregoing that this invention provides efficient method and apparatus for rapidly and effectively determining the load present in a marine mooring line at a floating vessel. The invention has been described above with respect to certain procedures and structures for the purposes of illustrating various preferred embodiments of the invention. Workers skilled in the art to which the invention pertains will appreciate that the invention may be embodied in procedures and structures different from those selected for description above. Therefore, the foregoing description should not be considered to be literally definitive of the scope of this invention.

We claim:

1. A method of ascertaining the tension in a mooring line extending from a point of support on a vessel disposed in a body of water to an anchor disposed below the surface of said water at a measurable vertical distance from the point of support, the method comprising the steps of:
    a. providing a plurality of graphical representations of the functional relationship between the tension in a mooring line, having the same submerged weight per unit length as the mooring line of interest, and the angle which the mooring line makes with a reference direction at the point of support, each of the individual representations corresponding to the functional relationship between tension and said angle for a specific value of vertical distance between the point of support and said anchor,
    b. measuring the aforesaid vertical distance and the value of the angle,
    c. locating the unique one of the plurality of graphical representations corresponding to the measured vertical distance, and
    d. locating on said unique one of the plurality of graphical representations a unique point corresponding to the value of the angle thereby to obtain a value of tension present in the mooring line of interest.

2. The method according to claim 1 wherein the value of the angle of the mooring line at the point of support is measured with reference to a horizontal reference line.

3. A method according to claim 2 wherein the vessel floats on the surface of the body of water, the point of support is located above the water surface, and the measurement of value of the angle is obtained by
    a. providing a graphical representation of the value of said angle as functions of the height of the point of support above the water surface and of the length of mooring line exposed between the water surface and the said point,
    b. measuring said height and said exposed length, and
    c. locating on the last mentioned graphical representation a unique point common to the last mentioned measurements to obtain a value of said angle.

4. A method according to claim 2 wherein the vessel floats on the surface of the body of water, the point of support is located above the water surface, the mooring line is defined by a length of chain, and the measurement of the value of said angle is obtained by
    a. providing a graphical representation of the value of said angle as a function of the height of the point of support above the water surface and of the number of links of the chain exposed between the water surface and said point of support,
    b. measuring said height,
    c. counting the number of chain links exposed between the point of support and the water surface, and
    d. locating on the last mentioned graphical representation a unique point common to the values of the last mentioned measurement and said count to obtain a value of said angle.

5. A method according to claim 1 wherein the amount of mooring line paid out between the point of support and the anchor is at least five times greater than said vertical distance.

6. A method of ascertaining the tension in a mooring line extending from a point of support on a vessel disposed in a body of water to an anchor disposed below the surface of said water at a measurable vertical distance below from the point of support, the method comprising the steps of
    a. providing a plurality of graphical representations of the functional relationship between the tension in a mooring line, having the same submerged weight per unit length as the mooring line of interest, and the horizontal distance between the point of support and the anchor, each of the individual representations corresponding to the functional relationship between tension and said horizontal distance for a specific value of vertical distance between the point of support and said anchor, b. measuring the aforesaid vertical distance and said horizontal distance, c. locating the unique one of the plurality of graphical representations corresponding to the measured vertical distance, and d. locating on said unique one of the plurality of graphical representations a unique point corresponding to the measured value of horizontal distance thereby to obtain a value of tension present in the mooring line of interest.

7. A method of ascertaining the tension in a mooring line extending from a point of support on a vessel disposed in a body of water to an anchor disposed below the surface of said water at a measurable vertical distance from the point of support, the method comprising the steps of a. generating a signal the value of which is indicative of the value of the angle between the mooring line next adjacent the point of support outboard of the vessel and a horizontal reference plane, b. modulating the generated signal in a predetermined manner by additional signals indicative of immersed weight per foot of mooring line, and the vertical distance between the point of support and the anchor, and c. applying the modulated signal to means for visually displaying the value thereof in terms of tension in the mooring line.

8. Apparatus for use in measuring the tensile load in a mooring line extending from a submerged anchor to the point of line support on a moored vessel floating above the anchor, said point of support being that most outboard of the vessel along the mooring line, the apparatus comprising shoe means laterally releasably engageable with the mooring line adjacent to and outboard of said point of support for assuming an attitude determined by the slope of the mooring line outboard of and next-adjacent to the point of support, the shoe means being arranged for paying out and taking in mooring line relative to the vessel during engagement of the shoe means with the mooring line, means for connecting the shoe means to the vessel to prevent movement of the shoe means along the mooring line, means connected to the shoe means and responsive to a change in attitude of the shoe means for manifesting the value of said slope at the location of the shoe means on the line, said slope manifesting means including an inclinometer mounted to the shoe means for generating a signal indicative of the angle of the mooring line at the shoe means relative to a horizontal reference plane, and means for correlating the angle of the mooring line as manifested by said signal to the amount of tension in the line at the point of support.

9. Apparatus according to claim 8 including means remote from the shoe means to which said signal is applied for visually indicating the value of tension present in the mooring line with which the shoe means is engaged.

10. Apparatus for use in measuring the tensile load in a mooring line extending from an anchor to the point of line support on a moored vessel most outboard of the vessel along the line and comprising shoe means releasably engageable with the mooring line adjacent to and outboard of the point of support for assuming an attitude determined by the slope of the mooring line outboard of and next adjacent to the point of support, means for connecting the shoe means to the vessel to prevent movement of the shoe means along the mooring line away from the vessel, a dial member mounted to the vessel adjacent the point of support, a dial pointer mounted to the dial member for movement relative thereto, and means coupling the shoe means to the dial member and the pointer and arranged so that the pointer moves relative to the dial member in response to changes in attitude of the shoe means, the dial member being adapted to receive a scale card, calibrated to indicate the tension in a particular mooring line with which the shoe means may be engaged, in a selected position thereon relative to the pointer.

11. Apparatus according to claim 10 wherein the dial pointer is rotatable relative to the dial member, and the pointer has an edge thereof which extends radially of its axis of rotation relative to the dial member.

12. In combination with apparatus according to claim 10, a scale card defining a graphical representation of the relation, for a given mooring line of characteristic emerged weight per foot and physical type, between a. mooring line slope at the shoe means, b. the vertical distance between the point of support and the anchor, and c. the tension in the given line at said point of support, the representation being displayed upon coordinate axes in which, when the card is received on the dial member in said selected position, varying values of said vertical distance are scaled along an axis parallel to the pointer, varying values of mooring line slope are scaled along an axis extending in the direction of movement of the pointer relative to the dial member, and varying values of tension are presented as contours relative to said coordinate axes.

\* \* \* \* \*